(12) United States Patent
Kellner et al.

(10) Patent No.: US 11,171,377 B2
(45) Date of Patent: Nov. 9, 2021

(54) MOTOR VEHICLE HIGH VOLTAGE ENERGY ACCUMULATOR

(71) Applicant: Dr. Ing. h.c. F. Porsche Aktiengesellschaft, Stuttgart (DE)

(72) Inventors: Philipp Kellner, Rennigen (DE); Jens Bohlien, Stuttgart (DE); Lukas Kohler, Bad Lebenzell (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 492 days.

(21) Appl. No.: 15/979,766

(22) Filed: May 15, 2018

(65) Prior Publication Data
US 2018/0337375 A1 Nov. 22, 2018

(30) Foreign Application Priority Data
May 16, 2017 (DE) ...................... 10 2017 110 578.6

(51) Int. Cl.
*H01M 2/10* (2006.01)
*H01M 10/6556* (2014.01)
*H01M 10/613* (2014.01)
*H01M 10/625* (2014.01)
*H01M 50/20* (2021.01)
(Continued)

(52) U.S. Cl.
CPC ......... *H01M 50/20* (2021.01); *H01M 10/613* (2015.04); *H01M 10/625* (2015.04); *H01M 10/6554* (2015.04); *H01M 10/6556* (2015.04); *H01M 10/6567* (2015.04);
(Continued)

(58) Field of Classification Search
None
See application file for complete search history.

(56) References Cited

U.S. PATENT DOCUMENTS 9,440,523 B2 9/2016 Decker
2011/0132580 A1* 6/2011 Herrmann ............. F28D 1/0478
165/104.33
(Continued)

FOREIGN PATENT DOCUMENTS

CN 104851996 A 8/2015
CN 206040779 U * 3/2017
(Continued)

OTHER PUBLICATIONS

Chinese Office Action for Chinese Application No. 201810463190. 9, dated Oct. 13, 2020, 8 pages.

*Primary Examiner* — Zhongqing Wei
(74) *Attorney, Agent, or Firm* — RatnerPrestia

(57) ABSTRACT

A motor vehicle high-voltage energy accumulator having a housing with battery modules mounted inside, wherein the housing has a bottom wall, a top wall, a front end wall, a rear end wall, a left side wall, and a right side wall. In each case, two oppositely arranged walls of the housing which are oriented in the longitudinal direction have load-path-forming supporting structure plates and cooling ducts through which cooling liquid flows. Here, the cooling ducts are either integrated directly into the supporting structure plate in the form of cavities or formed by the connection of a separate cooling structure plate to the supporting structure plate. The supporting structure plate and, where appropriate, the cooling structure plate increase the structural stability or the formation of cooling ducts.

16 Claims, 5 Drawing Sheets

(51) Int. Cl.
*H01M 10/6567* (2014.01)
*H01M 10/6554* (2014.01)
*H01M 10/647* (2014.01)
*B60L 50/60* (2019.01)
*B60L 58/26* (2019.01)

(52) U.S. Cl.
CPC ............... *B60L 50/66* (2019.02); *B60L 58/26* (2019.02); *H01M 10/647* (2015.04); *H01M 2220/20* (2013.01)

(56) References Cited

U.S. PATENT DOCUMENTS

2015/0171492 A1* 6/2015 Ramsayer .......... H01M 50/103
    429/120
2015/0236314 A1    8/2015 Lee et al.

FOREIGN PATENT DOCUMENTS

| DE | 102012218102 A1 * | 6/2013 | .......... H01M 10/625 |
| DE | 102012218102 A1 | 6/2013 | |
| DE | 102012012663 A1 | 12/2013 | |
| DE | 102014107388 A1 | 11/2015 | |

\* cited by examiner

MOTOR VEHICLE HIGH VOLTAGE ENERGY ACCUMULATOR

CROSS-REFERENCE TO RELATED APPLICATION

This application claims priority to German Patent Application No. DE 10 2017 110 578.6, filed May 16, 2017, which is incorporated by reference herein in its entirety.

FIELD OF THE INVENTION

The invention relates to a motor vehicle high-voltage electric energy accumulator for storing electrical energy in an electrically or part-electrically driven vehicle.

BACKGROUND OF THE INVENTION

High-voltage electric energy accumulators for electrically driven vehicles operate with operating voltages of several 100 V and therefore fundamentally constitute a fire risk particularly in the event of a crash. The high-voltage energy accumulators are as a rule arranged in the vehicle floor and are therefore accommodated in battery housings which have a high structural stability, to be precise in particular with respect to lateral crash situations. Since the battery modules can significantly heat up during charging and during discharging, the high-voltage energy accumulator is additionally equipped with a liquid cooling system.

DE 10 2012 012 663 A1, which is incorporated by reference herein, discloses a motor vehicle high-voltage energy accumulator having a housing whose bottom wall is formed by a planar plate and a structural component which, together with the planar plate, defines cooling liquid ducts. DE 10 2014 107 388 A1, which is incorporated by reference herein, discloses a similar bottom wall of a motor vehicle energy accumulator. DE 10 2012 218 102 A1, which is incorporated by reference herein, discloses, inter alfa, a housing tub comprising a structural component which has cooling ducts. The aforementioned energy accumulator housings alone do not have sufficient structural strength with respect to lateral crash situations, which means, for example, that additional transverse webs have to be provided within the housing in order to improve the structural strength.

Against this background, it is an object of the invention to provide a cooled motor vehicle high-voltage electric energy accumulator having high structural strength in the transverse direction.

SUMMARY OF THE INVENTION

This object is achieved according to aspects of the invention by a motor vehicle high-voltage energy accumulator having a housing in whose interior a plurality of battery modules are mounted, wherein the housing has a bottom wall lying in a horizontal plane, a top wall lying in a horizontal plane, a front end wall lying in a vertical transverse plane, a rear end wall lying in a vertical transverse plane, a left side wall lying in a vertical longitudinal plane and a right side wall lying in a vertical longitudinal plane, wherein the housing has load-path-forming supporting structure plates on two walls arranged oppositely in a horizontal plane or arranged oppositely in a vertical longitudinal plane, wherein the load path-forming supporting structure plates have cooling ducts through which cooling liquid flows, which ducts are jointly formed by the supporting structure plate and a cooling structure plate or are integrated into the supporting structure plate in the form of cavities.

The motor vehicle high-voltage energy accumulator according to aspects of the invention has a housing in whose interior a plurality of battery modules or battery cells are mounted. The housing is substantially rectangular, that is to say parallelepipedal, and has six walls, namely a bottom wall lying in a horizontal plane, a top wall lying in a horizontal plane, a front end wall lying in a vertical transverse plane, a rear end wall lying in a vertical transverse plane, a left side wall lying in a vertical longitudinal plane and a right side wall lying in a vertical longitudinal plane. All walls together form a substantially closed parallelepipedal housing in whose interior the battery modules are accommodated.

In each case two walls of the housing which are arranged opposite one another in pairs and are oriented in the longitudinal direction of the battery module each have a load-path-forming supporting structure plate and a cooling duct. The cooling duct is either integrated directly into the supporting structure plate in the form of cavities or is formed y the connection of a separate cooling structure plate to the supporting structure plate. The supporting structure plate and the cooling structure plate have a structure which serves substantially to increase the structural stability and/or the formation of cooling ducts.

The supporting structure plate serves substantially for the structural stability and strength of the entire supporting structure wall in the transverse direction of the vehicle. In the event of a crash in the transverse direction of the vehicle, the supporting structure plate takes up most of the loads taken up by the housing and can thus be optimized both in respect of the material and in respect of the specific cross-sectional profile therefor.

In each case the two walls lying in a horizontal plane, that is to say the bottom wall and the top wall, each have a supporting structure plate. The end walls do not have a supporting structure plate. The supporting structure plate differs from a non-supporting structure plate in terms of the property of being able to take up by deformation at least is twice as much crash energy as the non-supporting structure plates.

In one preferred embodiment, the supporting structure plates have dedicated cooling ducts in the form of cavities. What is advantageous in this embodiment is in particular the cost and weight advantage by dispensing with a separate cooling structure plate.

According to an alternative embodiment, the cooling duct structure is for the most part defined by the separate cooling structure plate which has corresponding cutouts. In terms of its main function, namely that of effectively cooling the side wall, the cooling structure plate can be optimized in respect of material and configuration or cross-sectional profile, with its structural stability not having to play a major role here.

In this way, a high-voltage energy accumulator having high structural strength in the transverse direction is provided.

The supporting structure plate preferably consists of a different material than the cooling structure plate. The supporting structure plate can consist, for example, of a high-strength steel or of another suitable metal. By contrast, the cooling structure plate can consist of a material which can have complex structures in order to form the cooling ducts. The cooling structure plate can consist of plastic, for example.

The supporting structure plate preferably has at least one, dry cavity which serves substantially for weight reduction and for increasing the areal moment of inertia while simultaneously reducing the weight. The supporting structure plate can have, for example, a framework-like structure which has a high structural stability combined with low overall weight. The cavities make it possible, for example, for a distal planar wall body and a proximal, planar wall body of the supporting structure plate to be spaced apart from one another.

The supporting structure wall formed in this way has a high structural stability in the transverse direction and also has efficient cooling. The cooling structure plate connected to the supporting structure plate also contributes to the structural stability of the housing side walls, but less so than the supporting structure plate. The two load-path-forming supporting structure walls are directly connected in a rigid and stiffening manner to the remaining four walls of the housing. The four remaining housing walls can be configured as substantially planar plates. It is possible in this way for an energy accumulator housing to be provided which has such a high transverse stability and stiffness that additional transverse webs within the housing can be completely dispensed with under certain circumstances.

In the present invention, mention is made exclusively of cooling ducts, a cooling liquid and cooling. In principle, it is intended by way of the claimed and described features relating to a cooling also for a heating of the energy accumulator to be able to be realized. In principle, the present invention is therefore to be understood in such a way that a heat exchange in both directions is made possible thereby, that is to say both a removal of heat from the energy accumulator and a supply of heat to the energy accumulator.

The cooling duct is preferably formed by an open duct channel in the cooling structure plate, wherein the opening of the duct channel is closed by a planar surface of the supporting structure plate. The cooling structure plate thus defines, with respect to the cooling duct cross section, three side walls of the cooling duct, and the supporting structure plate forms the fourth side wall of the cooling duct. It is therefore not necessary for the supporting structure plate to be additionally machined to form the cooling duct.

The cooling duct preferably extends over the entire surface of the supporting structure plate, with the result that the supporting structure plate is cooled over its whole surface and directly by the cooling liquid. A duct channel in the cooling structure plate can be produced relatively simply, with the result that the costs for the supporting structure wall can be kept relatively low.

According to a preferred refinement of the invention, the cross-sectional profile of the supporting structure plate is identical over the entire wall length in the longitudinal direction of the vehicle and/or the cross-sectional profile of the cooling structure plate is identical over the entire wall length. The supporting structure plate or the cooling structure plate can therefore each be formed by an extruded profile, for example an aluminum extruded profile or a pultruded profile made of plastic or a fibre-plastic composite. In this way, the structure plates can be produced relatively inexpensively and, where appropriate, without machining.

In a preferred refinement, the coo mg structure plate has a plurality of duct channels which extend in the longitudinal direction of the vehicle and are parallel to one another. The open side of the duct channels is closed by the supporting structure plate. The duct channels can be fluidically connected to one another in parallel, in series or in a mixed form.

The supporting structure plate preferably has, laterally a receiving trough for at least partially receiving the cooling structure plate. The cooling structure plate is thus embedded at least partially in a corresponding receiving trough of the supporting structure plate and projects partially therefrom or not at all.

According to a preferred refinement, the bottom wall adjoining the side wall or the adjoining top wall is fastened directly only on the side wall supporting structure plate and therefore connected only indirectly to the cooling structure plate. The cooling structure plate is thus directly connected only to the supporting structure plate. Since the cooling structure plate contributes at most to a small degree to the overall stability of the housing, a direct fixing of the cooling structure plate to the top wall or the bottom wall is unnecessary. Furthermore, stresses between the cooling structure plate and the supporting structure plate are avoided in this way. If the side walls do not form the supporting structure walls but the bottom wall and the top wall form the supporting structure ails, the bottom wall and top wall supporting structure plates are directly connected to the relevant side walls.

At least one end wall lying in a transverse plane preferably has a cooling liquid connection, for example a cooling liquid inlet and/or a cooling liquid outlet. With particular preference, all the cooling liquid connections are arranged on a single end wall, with the result that the other end wall does not have a single cooling liquid connection. In this way, the fluidic connection of the energy accumulator to the cooling circuit is relatively simple.

In principle, the cooling structure plate can be arranged proximally from the supporting structure plate, that is to say on the housing inner side of the supporting structure plate. With particular preference, however, the cooling structure plate is arranged distally from the supporting structure plate, that is to say is arranged on the housing outer side of the as supporting structure plate. In this way, it is ensured that, in the event of a leakage at the abutment surface between the supporting structure plate and the cooling structure plate, the cooling liquid cannot pass into the housing interior, whereby the battery modules could be damaged or destroyed. Nevertheless, the direct wetting of the supporting structure plate by the cooling liquid makes it possible to achieve a high cooling performance.

According to an alternative preferred embodiment, the cooling ducts are integrated into the supporting structure plates in the form of cavities. Here, the arrangement of the supporting structure plates can occur both laterally as side wall and/or in the upper and lower horizontal plane. In this embodiment, the supporting structure plate with integrated cooling ducts preferably consists of a profile which is extruded or produced in a continuous production process.

The load-path-forming supporting structure plates preferably have at least a wall thickness of 5.0 mm, whereas the non-load-path-forming walls have a smaller wall thickness. With particular preference, the load-path-forming supporting structure plates have at least twice the wall thickness of the non-load-path-forming walls. In this way, the load-path-forming supporting structure plates can take up at least twice, but particularly preferably several times, the crash energy in the form of deformation energy.

BRIEF DESCRIPTION OF THE DRAWINGS

Two exemplary embodiments of the invention are illustrated in more detail below with reference to the drawings. In the drawings.

DETAILED DESCRIPTION OF THE INVENTION

Figure 1:
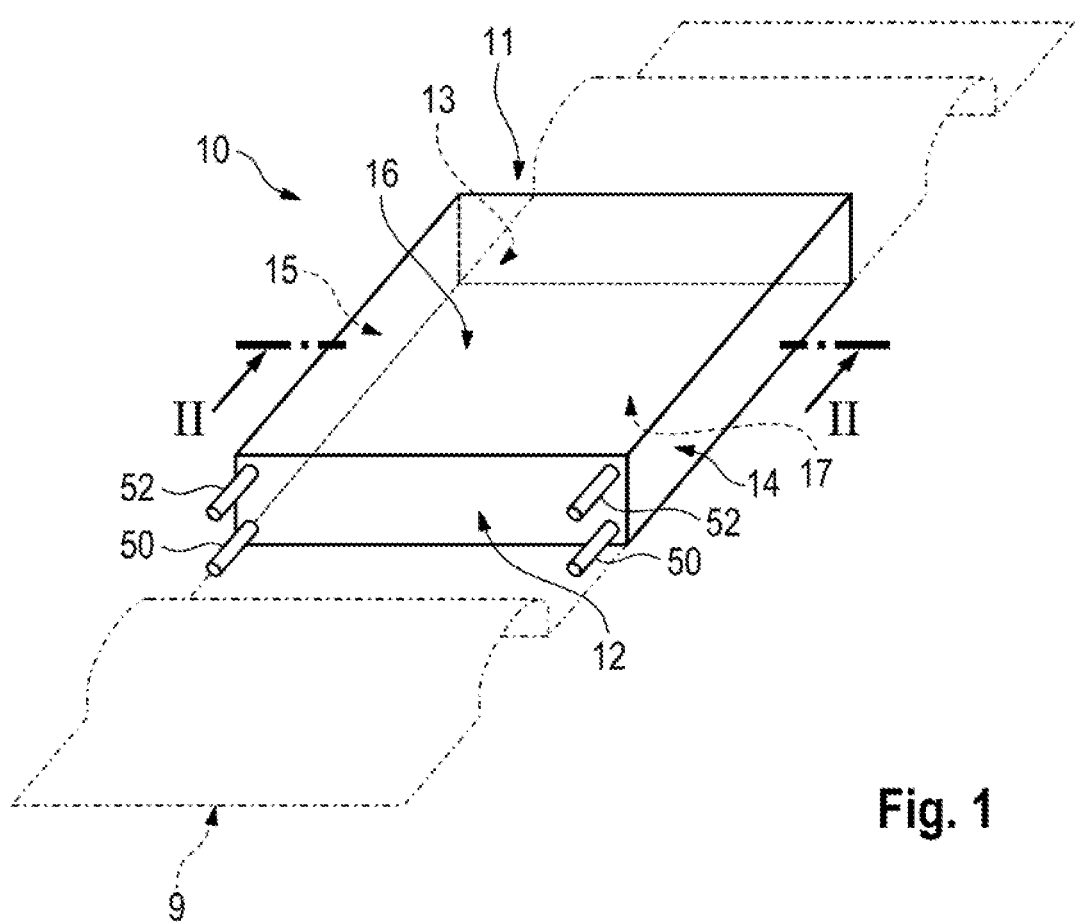
FIG. 1 shows a perspective view of a motor vehicle high-voltage energy accumulator according to aspects of the invention.

FIG. 1 is a perspective view illustrating, a parallelepiped& motor vehicle high-voltage energy accumulator 10 which is arranged in the floor region of an electrically or part-electrically driven motor vehicle 9. The energy accumulator 10 comprises a parallelepipedal and substantially closed housing 11 in whose interior 19 a plurality of battery modules 18 are arranged, as is indicated in FIG. 2.

The parallelepipedal housing 11 has six walls, namely a bottom wall 17 lying in a horizontal plane, a top wall 16 parallel thereto and likewise lying in a horizontal plane, a front end wall 13 lying in a vertical transverse plane, a rear end wall 12 parallel thereto and likewise lying in a vertical transverse plane, a liquid-coded left side wall 15 lying in a vertical longitudinal plane, and a likewise liquid-cooled right side wall 14 parallel thereto lying in a vertical longitudinal plane. In the present exemplary embodiment, only the two side walls 14, 15 are liquid-cooled, with the remaining four walls 12, 13, 16, 17 having no integrated liquid cooling.

The bottom wall 17, the top wall 16 and the two end walls 12, 13 are each designed as simple planar metal plate bodies which have no structuring and are therefore available relatively inexpensively. In the exemplary embodiments illustrated in FIGS. 2 and 3, the two mutually parallel side walls 14, 15 each form load-path-forming walls, that is to say each have a load-path-forming supporting structure plate. Only the two side walls 14, 15 have a complex structure, which is explained below.

Figure 2:
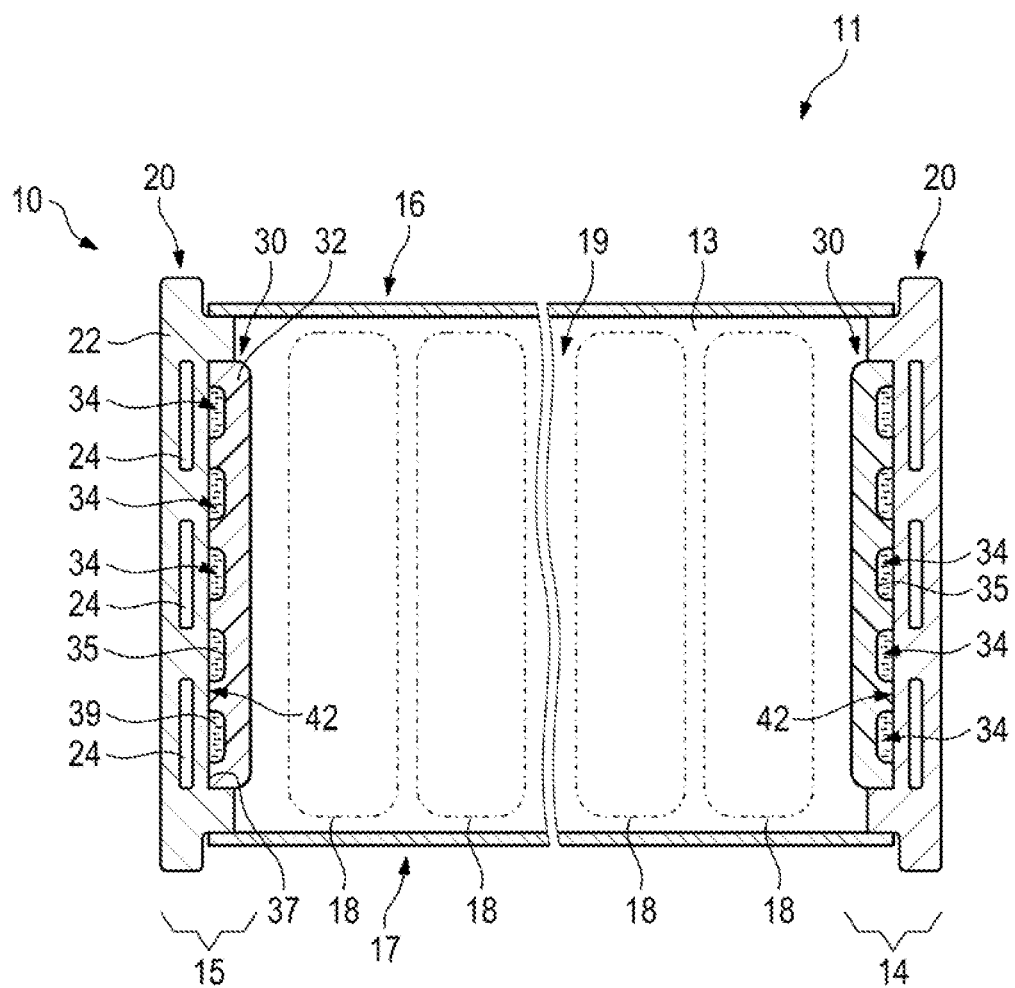
FIG. 2 shows the motor vehicle high-voltage energy accumulator of FIG. 1 in cross section II-II.

As can be seen in FIG. 2, each side wall 14, 15 has a respective supporting structure plate 20 and a respective cooling structure plate 30. The supporting structure plate 20 has a cross-sectional profile which is identical over the entire side wall length and consists of an extruded metal body 22, for example made of aluminum. The supporting structure plate 20 has a plurality of cavities 24 which extend in the longitudinal direction and are parallel to one another and afford a weight reduction but do not constitute a significant mechanical weakening of the supporting structure plate 20.

Furthermore, the supporting structure plate 20 has proximally a receiving trough 42 which has a planar vertical surface 37 at the trough bottom. The cooling structure plate 30 is inserted into the receiving trough 42 in such a way that it projects proximally only partially out of the receiving trough 42 and protrudes into the interior 19. The cooling structure plate 30 can be adhesively bonded to the supporting structure plate 20, for example, or can be connected or fixed to the supporting structure plate 20 in some other way, in any event in a liquid-tight manner.

The cooling structure plate 30 is formed by a plastic plate body 32 which has a plurality of duct channels 35 which extend in the longitudinal direction and which are parallel to one another. The plastic plate body 32 has a uniform cross-sectional profile over its entire length and is an extruded body. Alternatively, the plastic plate body 32 can also be a plastic injection-molded part which has, for example, duct channels extending in a meandering fashion.

The cooling ducts 34 are formed, on the one hand, by the duct channels 35 and, on the other, by the planar receiving trough surface 37 of the supporting structure plate 30. Flowing in the cooling ducts 34 formed in this way is a cooling liquid 39 which flows through the cooling liquid connections 50, 52 on the rear end wall 12 into the two side walls 14, 15 and out of them again. The front end wall 13 does not have a single cooling liquid connection. The two end walls 12, 13 close off liquid spaces in which a suitable bundling or deflection of the cooling lines formed by the cooling ducts 34 is realized.

Figure 3:
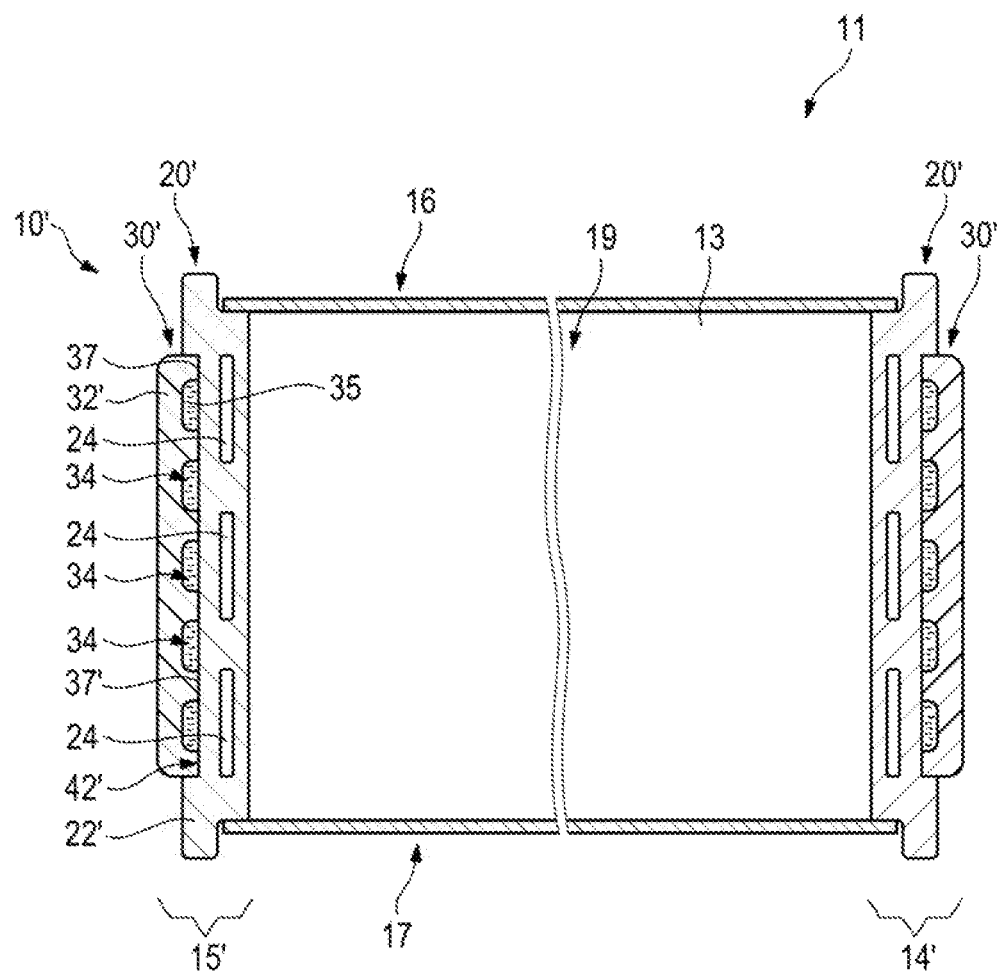
FIG. 3 shows a second embodiment of a motor vehicle high-voltage energy accumulator according to aspects of the invention in cross section.

FIG. 3 illustrates a second embodiment of the motor vehicle high-voltage energy accumulator 10', which differs from the energy accumulator 10 according to the first exemplary embodiment only in terms of the structure of the two side walls 14', 15'. In the second exemplary embodiment, the cooling structure plate 30' is arranged distally from the supporting structure plate 20'. Therefore, the supporting structure metal body 22' has the receiving trough 42' on the outside. The plastic plate body 32' of the cooling structure plate 30' is inserted into the receiving trough 42' from outside. This exemplary embodiment of the side walls 14', 15' has the advantage that, in the event of a leakage at the interface between the supporting structure plate 20' and the cooling structure as plate 30', the cooling liquid running out cannot pass into the interior 19. Nevertheless, the direct cooling liquid wetting of the supporting structure plate 20' makes it possible to achieve a high cooling performance.

Figure 4:
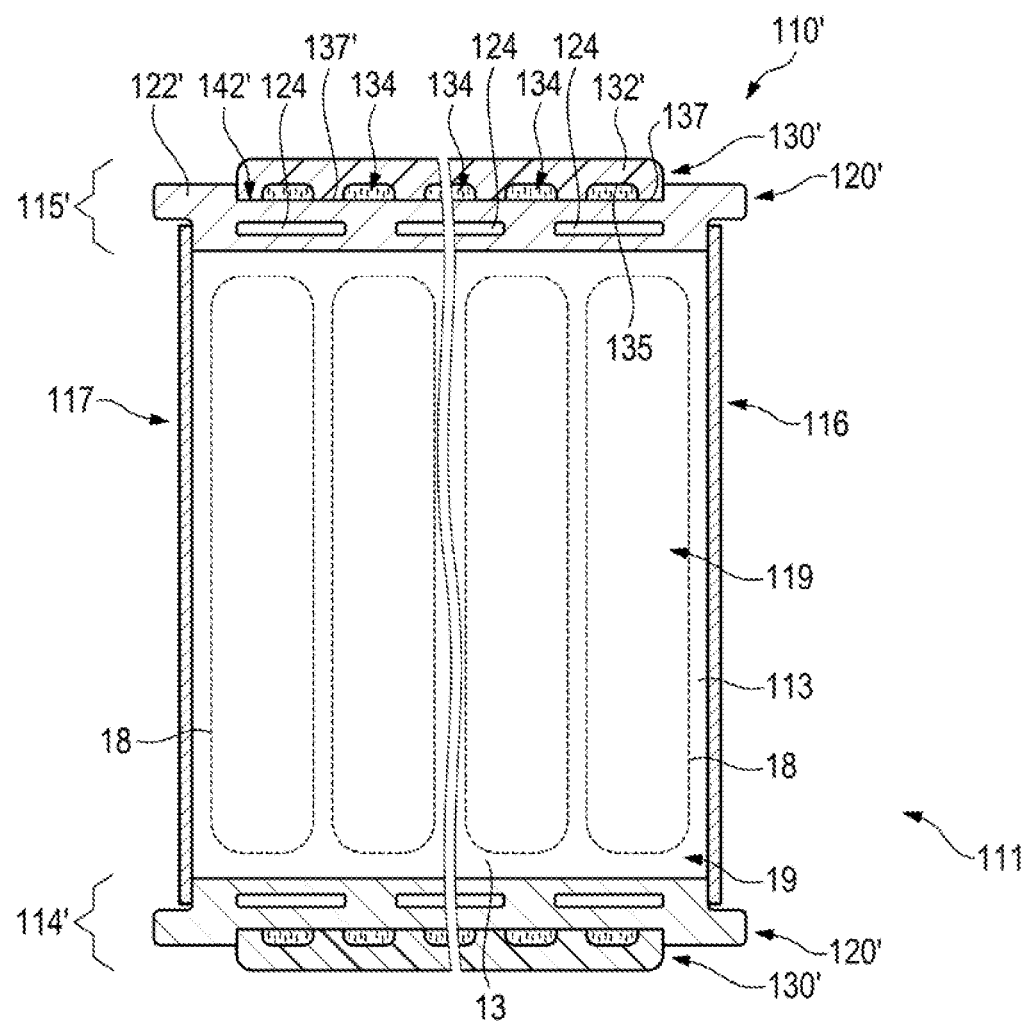
FIG. 4 shows a third embodiment of a motor vehicle high-voltage energy accumulator according to aspects of the invention in cross section.

FIG. 4 illustrates a third embodiment of a motor vehicle high-voltage energy accumulator according to aspects of the invention in cross section. By comparison with the first two embodiments of FIGS. 2 and 3, in the embodiment illustrated in FIG. 4 the bottom wall 114' and the top wall 115' are designed as load-path-forming walls, whereas the remaining walls, namely the two side walls and the two end walls, are of thin-walled design and have only a small load path function, if any. Moreover, the structure of the top wall 115' and of the bottom wall 114' corresponds to the structure and the design of the side walls 15', 14' illustrated in FIG. 3. The reference signs which correspond with one another are each raised by 100 in FIG. 4 relative to the reference signs of FIG. 3. The embodiment in FIG. 4 thus represents a distal cooling analogous to FIG. 3. In a variation of the embodiment in FIG. 4, a proximal cooling as illustrated in FIG. 2 can also be used.

Figure 5:
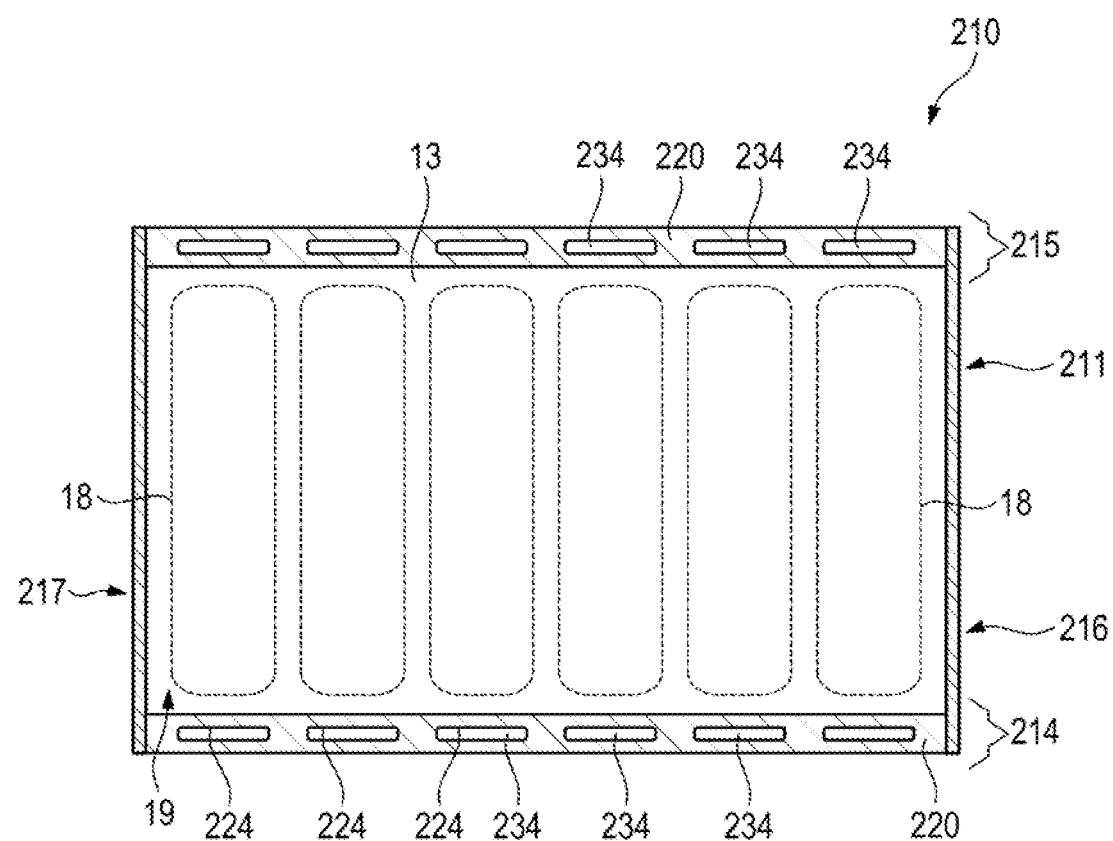
FIG. 5 shows a fourth embodiment of a motor vehicle high-voltage energy accumulator according to aspects of the invention in cross section.

FIG. 5 illustrates a fourth exemplary embodiment of a motor vehicle high-voltage energy accumulator 210 according to aspects of the invention in cross section. In a similar way as in the exemplary embodiment illustrated in FIG. 4, the top wall 215 and the bottom wall 214 here form the load paths and each have a load-path-forming supporting structure plate 220. The supporting structure plate 220 has duct-like cavities 224 which extend in the longitudinal direction and which in this way form cooling ducts 234 through which a cooling liquid flows. The two load-path-forming walls 214, 215 are thus formed by a one-piece supporting structure plate 220 which both forms the cooling ducts and produces the structural stability. In a variation of the embodiment in FIG. 5, it is also possible, instead of the top wall 215 and bottom wall 214, for the side walls 216, 217 to have supporting structure plates 220 with duct-like cavities 224 which extend in the longitudinal direction and which in this way form cooling ducts 234 through which a cooling liquid flows.

What is common to all the embodiments described is that the supporting structure plates and, where appropriate, also the cooling structure plates each consist of an extruded profile or of a profile produced in a continuous production process. The respective supporting structure plate in each case has a minimum wall thickness of at least 5.0 mm and therefore has at least twice the wall thickness as the remaining walls which do not form load paths.

What is claimed is:

1. A motor vehicle high-voltage energy accumulator comprising:
    a plurality of battery modules;
    a housing in whose interior the plurality of battery modules are mounted, the housing having a bottom wall lying in a horizontal plane, a top wall lying in a horizontal plane, a front end wall lying in a vertical transverse plane, a rear end wall lying in a vertical transverse plane, a left side wall lying in a vertical longitudinal plane and a right side wall lying in a vertical longitudinal plane; and
    supporting structure plate assemblies forming two of the walls of the housing and either arranged oppositely in a horizontal plane or arranged oppositely in a vertical longitudinal plane,
    wherein each supporting structure plate assembly has a monolithic supporting structure plate, a cooling structure plate, and cooling ducts through which cooling liquid flows, the cooling ducts jointly formed by the monolithic supporting structure plate and the cooling structure plate, wherein the cooling structure plate is positioned within a trough of the monolithic supporting structure plate, and wherein the trough constitutes a thickness-reduced portion of the monolithic supporting structure plate,
    wherein the monolithic supporting structure plate further comprises a first horizontal projection, wherein the trough is formed on one side of the first horizontal projection, and a first shoulder is formed on an opposite side of the horizontal projection, wherein the top wall is seated on the first shoulder.

2. The motor vehicle high-voltage energy accumulator as claimed in claim 1, wherein each of the cooling ducts is formed by an open duct channel in the cooling structure plate, wherein an opening of the duct channel is closed by a planar surface of the monolithic supporting structure plate.

3. The motor vehicle high-voltage energy accumulator as claimed in claim 1, wherein a cross-sectional profile of the monolithic supporting structure plate is identical over an entire wall length.

4. The motor vehicle high-voltage energy accumulator as claimed in claim 1, wherein a cross-sectional profile of the cooling structure plate is identical over an entire wall length.

5. The motor vehicle high-voltage energy accumulator as claimed in claim 1, wherein the cooling structure plate has a plurality of duct channels which extend in the longitudinal direction and are parallel to one another.

6. The motor vehicle high-voltage energy accumulator as claimed in claim 1, wherein the rear end wall has a cooling liquid connection.

7. The motor vehicle high-voltage energy accumulator as claimed in claim 1, wherein the front end wall does not have any cooling liquid connection.

8. The motor vehicle high-voltage energy accumulator as claimed in claim 1, wherein the cooling structure plate is arranged distally from the monolithic supporting structure plate.

9. The motor vehicle high-voltage energy accumulator as claimed in claim 1, wherein the monolithic supporting structure plates of the housing have in at least a portion at least one of a wall thickness of at least 5.0 mm and at least twice the wall thickness of other walls of the housing.

10. The motor vehicle high-voltage energy accumulator as claimed in claim 1, wherein the monolithic supporting structure plates of the housing consist of a profile which is at least one of extruded and produced in a continuous production process.

11. The motor vehicle high-voltage energy accumulator as claimed in claim 1, wherein a wall thickness of each monolithic supporting structure plate is at least twice a wall thickness of one of the walls that spans between the monolithic supporting structure plates.

12. The motor vehicle high-voltage energy accumulator as claimed in claim 1, wherein the monolithic supporting structure plate has cavities that are positioned beside the cooling ducts, wherein the cavities extend in the same direction as the cooling ducts.

13. The motor vehicle high-voltage energy accumulator as claimed in claim 1, wherein the monolithic supporting structure plate at least partially overlaps the cooling structure plate in a direction of assembling those plates.

14. The motor vehicle high-voltage energy accumulator as claimed in claim 1, wherein the monolithic supporting structure plate further comprises a second horizontal projection, wherein the trough is also formed on one side of the second horizontal projection, and a second shoulder is formed on an opposite side of the second horizontal projection, wherein the bottom wall is seated on the second shoulder.

15. The motor vehicle high-voltage energy accumulator as claimed in claim 14, wherein the trough is defined between the first and second horizontal projections.

16. The motor vehicle high-voltage energy accumulator as claimed in claim 14, wherein the cooling structure plate is positioned between the first and second horizontal projections.

* * * * *